(12) United States Patent
Metge

(10) Patent No.: US 12,505,558 B2
(45) Date of Patent: Dec. 23, 2025

(54) METHOD, COMPUTER PROGRAM, DEVICE, AND SYSTEM FOR TRACKING A TARGET OBJECT

(71) Applicant: BULL SAS, Les Clayes-sous-Bois (FR)

(72) Inventor: Baptiste Metge, Grenoble (FR)

(73) Assignee: BULL SAS, Les Clayes-sous-Bois (FR)

( * ) Notice: Subject to any disclaimer, the term of this patent is extended or adjusted under 35 U.S.C. 154(b) by 348 days.

(21) Appl. No.: 18/296,332

(22) Filed: Apr. 5, 2023

(65) Prior Publication Data

US 2023/0326037 A1 Oct. 12, 2023

(30) Foreign Application Priority Data

Apr. 11, 2022 (EP) .................................... 22305515

(51) Int. Cl.
| | |
|---|---|
| *G06T 7/20* | (2017.01) |
| *G06T 7/70* | (2017.01) |
| *G06V 10/82* | (2022.01) |
| *G06V 20/52* | (2022.01) |
| *H04N 7/18* | (2006.01) |

(52) U.S. Cl.
CPC .................. *G06T 7/20* (2013.01); *G06T 7/70* (2017.01); *G06V 10/82* (2022.01); *G06V 20/52* (2022.01); *G06T 2207/10016* (2013.01); *G06T 2207/20081* (2013.01); *G06T 2207/20084* (2013.01); *G06T 2207/30232* (2013.01); *G06T 2207/30241* (2013.01); *H04N 7/18* (2013.01)

(58) Field of Classification Search
CPC .... G06T 7/20; G06T 7/70; G06T 2207/10016
See application file for complete search history.

(56) References Cited

U.S. PATENT DOCUMENTS

2022/0004768 A1\* 1/2022 Pelletier ................. G06V 20/40
2023/0068001 A1\* 3/2023 Ali ........................ G08G 1/0175

FOREIGN PATENT DOCUMENTS

CA 3156840 A1 1/2022
CN 110610514 A \* 12/2019 ............. G06T 7/194
(Continued)

OTHER PUBLICATIONS

European Search Report and Written Opinion issued in EP22305515, dated Oct. 4, 2022 (3 pages).
(Continued)

*Primary Examiner* — Wesley L Kim
(74) *Attorney, Agent, or Firm* — ARC IP Law, PC; Joseph J. Mayo

(57) ABSTRACT

The invention relates to a method of tracking a target object in an image stream captured by a camera, at a capture frequency. The method includes a tracking phase, implemented individually for several processed images of said image stream, wherein the tracking phase includes detecting at least one object, and its position, in the processed image, and identifying the target object among the at least one object detected in the processed image. The tracking phase is carried out at a detection frequency, that is lower than the capture frequency, so that two images processed during two successive iterations of the tracking phase are separated by at least one non-processed image to which the tracking phase is not applied. The invention also relates to a computer program, a device, and a system implementing such a method.

11 Claims, 3 Drawing Sheets

(56) References Cited

FOREIGN PATENT DOCUMENTS

| EP | 3839816 A1 | 6/2021 | |
|---|---|---|---|
| EP | 3937071 A1 * | 1/2022 | ......... G06F 18/2178 |
| WO | 2022/000094 A1 | 1/2022 | |

OTHER PUBLICATIONS

Lee, et al., "Trajectory-based vehicle tracking at low frame rates", Expert Systems with Applications, vol. 80, Mar. 14, 2017, pp. 46-57.

Lee, et al., "Tracking Multiple Moving Vehicles in Low Frame Rate Videos based on Trajectory Information", 2013 IEEE international Conference on Systems, Man and Cybernetics; Oct. 13, 2013; 6 pages.

* cited by examiner

METHOD, COMPUTER PROGRAM, DEVICE, AND SYSTEM FOR TRACKING A TARGET OBJECT

This application claims priority to European Patent Application Number 22305515.3, filed 11 Apr. 2022, the specification of which is hereby incorporated herein by reference.

BACKGROUND OF THE INVENTION

Field of the Invention

At least one embodiment of the invention relates to a method for tracking a target object in images taken by at least one camera. At least one embodiment also relates to a computer program, a device, and a system implementing such a method.

The field of the invention is generally the field of tracking objects from images captured by cameras, and in particular in real time.

Description of the Related Art

Cities are increasingly equipped with video surveillance cameras whose number is increasing faster than the number of human operators. It is very difficult to track a target object, such as a person or a vehicle. If the operator is disturbed, he/she can lose the target object, and finding it again can be particularly tedious. The tracking of several target objects at a time is even more difficult.

Tracking solutions are known based on deep learning models and especially re-identification models. The purpose of these solutions is to process the images of an image stream from one or more cameras with a view to identifying the target object, and more generally all the objects that move, in each image of said image stream. Conventionally, each image of the image stream is first processed by an object detector, such as an object detector implementing the RESNET50 model, in order to identify at least one object and its position in the image. Then, each object is identified by comparing its visual signature with that of the objects identified in the previously processed images. Thus, a single target object can be identified on all the images on which it appears and a trajectory, or a tracklet, of said object may be determined according to its movement within each image, and therefore the imaged scene.

However, these solutions are complex, energy-intensive and computational resource-intensive. These shortcomings limit the deployment of these solutions in the real world.

One aim of at least one embodiment of the invention is to solve at least one of the drawbacks of the state of the art.

Another aim of at least one embodiment of the invention is to propose a solution for tracking objects that is less energy-intensive and computational resource-intensive while having similar, or even identical, performance to the current solutions.

BRIEF SUMMARY OF THE INVENTION

At least one embodiment of the invention proposes to achieve at least one of the aforementioned aims by a method for tracking a target object in an image stream captured by a camera at a capture frequency, $F_c$, said method comprising several iterations of a tracking phase implemented individually for several images, called processed images, of said image stream, and comprising the following steps:

detecting in the processed image at least one object and its position, and identifying said target object from the at least one object detected in said processed image;

characterized in that said tracking phase is carried out at a detection frequency, $F_s$, lower than said capture frequency $F_c$, so that two processed images during two successive iterations of the tracking phase are separated by at least one non-processed image to which said tracking phase is not applied.

Thus, one or more embodiments of the invention proposes following a target object by processing only a portion of the images of the image stream captured by the camera. In other words, at least one embodiment of the invention proposes to abandon processing all the images of the image stream and proposes to process only some of the images of the image stream. Thus, the solution proposed by one or more embodiments of the invention is less energy-intensive and computational resource-intensive compared to the current solutions which propose to process all the images of an image stream.

Furthermore, the inventor of the disclosure has noticed that processing only a portion of the images does not reduce, or only barely reduces, the tracking performance. Indeed, the inventor has noticed that the capture frequency of existing cameras is such that the movement of a target object can be deduced and tracked effectively and faithfully from only a portion of the images forming an image stream captured by the camera. This observation is even more true when the speed of movement of the target object is low, such as humans, for example.

In at least one embodiment, "object" or "target object" means any type of object, such as a human, an animal, a car, etc.

In at least one embodiment, "tracklet" means a set of at least one image, or image area, belonging to the same object and captured by a camera.

In a known manner, the appearance distance between two images can be calculated by generating a digital signature for each of the images, for example by an intelligent model such as a neural network, then by calculating the distance, Euclidean or cosine, between these two digital signatures.

"Camera" means any type of image acquisition apparatus, such as any type of RGB, LIDAR, thermal, or 3D camera, etc.

"Processed image" means an image of the image stream to which the tracking phase is applied. In contrast, "non-processed image" means an image of the image stream to which the tracking phase is not applied.

According to one or more embodiments of the invention, the method may comprise a step of estimating the position of the target object at a time located between the capture times of two images processed during two successive iterations of the tracking phase, based upon the positions of said target object in said processed images.

Such an estimation can be carried out according to any predetermined relationship.

According to one or more embodiments, the position of the target object at said time can be carried out according to a law of linear movement. In other words, the target object is considered to move in a linear fashion between the positions thereof detected in two processed images. Thus, for each time located between the times of capture of the processed images, the position of the target object is determined on the linear trajectory meeting the positions of the target object in said processed images.

For example, let P1 and P2 be the positions of the target object in two processed images IM1 and IM2 captured at times T1 and T2, respectively. The position of the target object at each intermediate time $TI_i$ located between times T1 and T2, such that $T1<TI_i<T2$ can be determined by considering that the target object moved linearly, and at constant speed, between the positions P1 and P2 during the period (T2−T1).

Using the same principle, it is also possible to determine the position of the target object in a non-processed image, captured between the capture times of two processed images during two successive iterations of the tracking phase, based upon the positions of the target object detected in said processed images.

According to one or more embodiments, the frequency of carrying out the tracking phase can be determined based upon a number of images separating the processed images.

For example, in at least one embodiment, the tracking phase can be implemented for each image every N image(s), with N≥2, and preferentially N≥20, so that two successive iterations of the tracking phase are applied to two images separated, in time, by at least one image, and in particular by N images, which are non-processed.

The number N may, in an entirely non-limiting manner, be determined based upon the capture frequency of the camera, and more generally upon the capture frequency of the images in the image stream.

In this case, according to at least one embodiment, the tracking phase can be carried out for a processed image $IM_1$. The next image that will be processed by the next iteration of the tracking phase will be image $IM_N$. For example, if N=20, the processed images will be images $IM_1$, $IM_{21}$, $IM_{41}$, etc., captured by the camera.

According to one or more embodiments, the frequency of carrying out the tracking phase can be determined based upon a duration separating the capture times of the processed images.

According to at least one embodiment, the tracking phase can be carried out for each captured image every DUR seconds.

For example, in at least one embodiment, the duration DUR separating two processed images during two successive iterations of the tracking phase may be between 1 and 5 seconds and in particular between 2 and 3 seconds. The duration DUR is not necessarily an integer. In this case, by way of one or more embodiments, the tracking phase can be carried out for a processed image $IM_1$ captured at time T1. The next image which will be processed by the next iteration of the tracking phase will be the image captured at a time T2 such that T2=T1+DUR, and so on.

According to one or more embodiments, the image stream can be captured prior to the first iteration of the tracking phase so that the target object is not tracked in real time.

In this case, in at least one embodiment, the target object can be tracked in a database of images, in the context for example of a search in a recent past.

According to one or more embodiments of the invention, the method can be implemented to track the target object in real time.

In this case, in at least one embodiment of the invention, the method may further comprise a step of transmitting, from the camera to a tracking device, each processed image.

In a particularly advantageous but in no way limiting way, in one or more embodiments, only the processed images can be transmitted to the tracking device. Thus, the images captured by the camera, but which will not be processed during the tracking phase, are not transmitted to the tracking device. Thus, at least one embodiment of the invention makes it possible to reduce the data transmitted from the camera to the tracking device, and is therefore less intensive in communication resources.

According to one or more embodiments of the invention in the context of real-time tracking, a processed image can be transmitted from the camera to the tracking device at the request of said tracking device.

In this case, in at least one embodiment, the tracking device sends a request to the camera requesting the camera to capture an image at a time T1 and to transmit it to it. The tracking device then processes the received image. Then, when approaching a time T2 which corresponds to the time of capture of the next image to be processed, the tracking device sends a request to the camera asking the camera to capture a new image at said time T2 and to transmit it to it, and so on.

Alternatively, in at least one embodiment, an image capture plan can be transmitted to the camera, for example by the tracking device, said capture plan indicating several, or even all the times for capturing images to be processed, for example at the beginning of the tracking phase.

According to one or more embodiments of the invention in the context of real-time tracking, the camera can be arranged to capture only the processed images.

In other words, in at least one embodiment, the camera can be activated only for capturing the images that will be processed during the tracking phase and deactivated the rest of the time. Thus, if two images successively processed by the tracking phase are captured at times T1 and T2, the camera can be activated at times T1 and T2 in order to capture and transmit the processed images to the tracking device, and deactivated between times T1 and T2, which enables energy savings, reduces camera fatigue and increases its service life.

Advantageously, by way of one or more embodiments, the detection step can be carried out by an artificial intelligence model, and in particular by a neural network, previously trained to detect the presence of an object in an image.

Such a model may be a convolutional neural network, such as RESNET50, trained to detect objects in an image and indicate the position thereof. Neural networks for detecting objects and the positions thereof in images are well-known to a skilled person, and will therefore not be disclosed in greater detail herein for the sake of conciseness.

The position of an object on an image may for example correspond to the center of a rectangle surrounding said object on said image. Of course, in one or more embodiments, it is possible to determine the position in another way, such as for example by taking a corner of said rectangle, etc.

The step of identifying a target object on a processed image can comprise the following steps:
- for each object detected on said processed image, calculating a spatial distance between the position of said object and the position of the target object detected on a previously processed image,
- spatial filtering of the objects based upon said calculated distances and a predetermined spatial distance threshold value, SDS,
- calculating an appearance distance between a visual signature of the target object detected on the previously processed image and a visual signature of each object retained after the filtering step, and
- identifying the target object based upon said appearance distances.

The spatial distance threshold value SDS can be determined by tests.

More particularly, in one or more embodiments, the SDS can be determined based upon the target object, in particular based upon a size of the object and/or a speed of the target object.

According to one or more embodiments, the SDS can be proportional to the width of the target object on the processed images, such that:

$$SDS=K*L$$

where L is the width of the target object and K is a multiplier coefficient.

According to one or more embodiments, the multiplier coefficient K may depend on the frequency, or the rate, of the iteration of the tracking phase. Indeed, in at least one embodiment, the inventor has observed that a target object cannot move by more than K times its own width between two iterations of the tracking phase.

According to one or more embodiments, K is a real number such that K=k*D, where:
- D is the duration, in seconds, separating the capture times of two processed images during two successive iterations of the tracking phase, and
- k is a real number.

According to one or more embodiments, $1 \leq k \leq 2$

The appearance distance may be the Euclidean distance or the cosine distance between two visual signatures of two objects.

At least one visual signature can be generated by an artificial intelligence model, and in particular by a neural network, previously trained for this. Neural networks for generating a visual signature of an object are well-known to a skilled person and will therefore not be disclosed in greater detail herein.

According to at least one embodiment of the invention, a computer program is proposed comprising executable instructions which, when they are executed by a computer apparatus, implement all the steps of the method according to one or more embodiments of the invention, for tracking a target object.

The computer program can be in any computer language, such as, for example, in machine language, in C, C++, JAVA, Python, etc.

According to at least one embodiment of the invention, a device is proposed for tracking a target object comprising means configured to implement all the steps of the method, according to one or more embodiments of the invention, for tracking a target object.

The device according to at least one embodiment of the invention can be any type of apparatus such as a server, a computer, a tablet, a calculator, a processor, a computer chip, programmed to implement the method according to one or more embodiments of the invention, for example by the computer program according to one or more embodiments of the invention.

According to at least one embodiment of the invention, a system for tracking a target object is proposed, comprising:
- at least one camera with an image stream capture frequency $F_c$, and
- a device for tracking a target object according to one or more embodiments of the invention.

At least one camera may be local or remote from the tracking device. In the latter case, the camera may be in communication with the tracking device through a wired or wireless communication network, such as for example the Internet.

In the case the system comprises several cameras, the latter can be distributed in space, for example within a place, such as a train station or an airport, or in a city, or even along a traffic lane.

BRIEF DESCRIPTION OF THE DRAWINGS

Other benefits and features shall become evident upon examining the detailed description of entirely non-limiting examples of one or more embodiments of the invention, and from the appended drawings in which.

DETAILED DESCRIPTION OF THE INVENTION

It is clearly understood that the one or more embodiments that will be described hereafter are by no means limiting. In particular, it is possible to imagine variants of the one or more embodiments of the invention that comprise only a selection of the features disclosed hereinafter in isolation from the other features disclosed, if this selection of features is sufficient to confer a technical benefit or to differentiate the one or more embodiments of the invention with respect to the prior art. This selection comprises at least one preferably functional feature which is free of structural details, or only has a portion of the structural details if this portion alone is sufficient to confer a technical benefit or to differentiate the one or more embodiments of the invention with respect to the prior art.

In particular, all of the described variants and embodiments can be combined with each other if there is no technical obstacle to this combination.

In the figures and in the remainder of the description, the same reference has been used for the features that are common to several figures.

Figure 1:
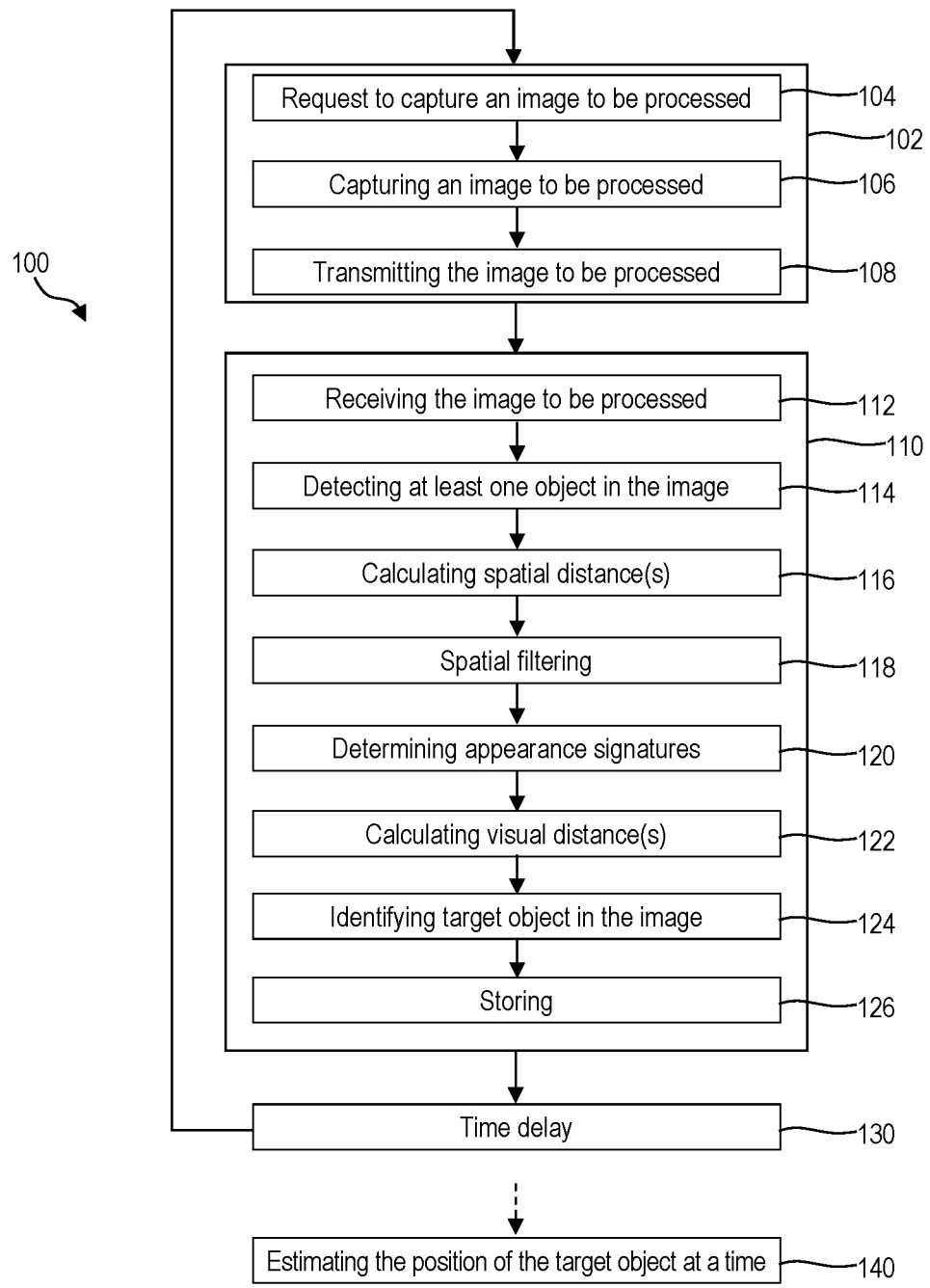
FIG. 1 is a schematic depiction of a method according to one or more embodiments of the invention for tracking a target object.

FIG. 1 is a schematic depiction of a method according to one or more embodiments of the invention for tracking a target object in real time.

The method 100 of FIG. 1 can be used to track, in real time, any type of target objects, such as humans, animals, cars, etc. from an image stream coming from one or more cameras.

Hereinafter, and without being any less general, it is considered that the stream of images comes, or has been obtained, from a single camera. Hereinafter, and without being any less general, it is assumed that the method is used for tracking a target person in real time.

The method 100 comprises a step 102 of obtaining an image to be processed, denoted IM1, for a capture time T1.

According to at least one embodiment, the image IM1 can be received in an automated manner. For example, in one or more embodiments, before the start of tracking, a tracking plan, indicating the capture times of the images to be processed, can be communicated to the camera, for example by a tracking device. The latter can acquire an image at each time indicated in the tracking plan and automatically transmits it to the tracking device implementing the tracking.

Alternatively, and as shown in FIG. 1, by way of one or more embodiments, step 102 can comprise a step 104 of sending, to the camera, a request to capture image IM1 at time T1 for example by the tracking device. This request can be sent to the camera when approaching time T1. At time T1, the camera can capture image IM1 during a step 106. The captured image $IM_1$ can be transmitted to the tracking device, through a wired or wireless connection, optionally via a private or public communication network, such as the Internet.

According to at least one embodiment, the camera can capture images at a capture frequency $F_c$. In this case, according to at least one embodiment, steps 104 and 106 are replaced by a step, not shown, requesting the image captured at time T1. The camera, or an intermediate server wherein the images are stored, can then communicate the image captured at time T1 to the tracking device, during step 108.

The method 100 can comprise a tracking phase 110 carried out for image IM1 obtained in step 102, according to at least one embodiment.

The tracking phase 110 comprises a step 112 of receiving the image to be processed, IM1 captured at time T1, according to at least one embodiment.

Image IM1 is processed during a detection step 114, in order to detect at least one object present in said image and its position. This detection can be carried out with solutions well known to those skilled in the art, such as, for example, the RESNET50 model. Step 114 therefore provides a list of at least one detected object, with their position, and the image area associated with each object.

During a step 116, a spatial distance $DS_j$ is calculated between each detected object and the position of the detected target object during a previous iteration of the tracking phase 110. Thus, by way of at least one embodiment, step 116 provides a spatial distance $DS_j$ between each detected object in the image and the target object detected in the processed image during an immediately preceding iteration. When this is the first iteration of the tracking phase, then each detected object is a new object and a new tracklet is associated with said new detected object.

During a step 118, according to at least one embodiment, a filtering is applied to the spatial distances $DS_j$ to keep only the objects whose spatial distance $DS_j$ is less than or equal to a previously defined spatial distance threshold, SDS. This step 118 aims to eliminate the objects detected on image IM1 that are located at positions at which the target object cannot be located, given its previously detected position. Step 118 therefore provides only a list of at least one object located in positions that the target object can occupy at time T1, unless the target object is not visible.

During a step 120, according to at least one embodiment, an appearance signature, or a visual signature, is determined for each object not eliminated by the spatial filtering of step 118. The visual signature of each object can be determined with solutions well-known to a skilled person, such as for example a neural network trained beforehand for this, taking as input the area of the image corresponding to said object. Step 120 therefore provides, for each object having passed the spatial filtering of step 118, a visual signature.

During a step 122, according to at least one embodiment, a visual distance $DV_k$ is calculated between each object having passed the spatial filtering and the target object, based upon on the signature of said object and the target object. This distance between may be a Euclidean distance or a cosine distance.

During a step 124, according to at least one embodiment, the target object is identified based upon of the visual distances calculated in step 122. In particular, the target object corresponds to that of the objects detected on the image to be processed, and in which:
- the visual distance $DV_k$ is the smallest, and
- the visual distance $DV_k$ is less than a predetermined re-identification threshold, SRI.

The position of the target object, according to at least one embodiment, in the processed image IM1 is then stored, during a step 126, in association with the time of capture T1 of the processed image IM1. The tracking phase 110 for image IM1 is completed and can be reiterated for a new image, denoted IM2.

According to one or more embodiments of the invention, image IM2 processed during a following iteration is not the image that immediately follows image IM1, so that the camera can capture, or does capture, at least one image, referred to as non-processed image, between image IM1 and IM2 and which is not processed during a tracking phase.

According to at least one embodiment of the invention, shown in FIG. 1, a predetermined duration DUR is imposed between time T1 and time T2 corresponding to the time of capture of image IM2, so that T2=T1+DUR. In all cases, the duration DUR is selected so that DUR>1/$F_c$, where $F_c$ is the frequency at which the camera can capture, or does capture, images. According to at least one embodiment, DUR=2 s.

To do this, according to at least one embodiment, the method 100 can comprise, following the tracking phase 110, a step 130 of time delay until reaching time T2. When time T2 is reached, or is about to be reached, the method 100 is reiterated for an image IM2 captured at time T2, and so on.

According to at least one embodiment, not shown in FIG. 1, the method 100, and in particular the tracking phase 110, can be reiterated every N images, where N≥2, so that the camera captures, or is capable of capturing, between images IM1 and IM2 processed by two successive iterations of the method 100 and in particular of the tracking phase 110, at least one intermediate image which will not be processed by the tracking phase 110.

According to at least one embodiment, N=20 images.

Thus, by way of one or more embodiments, the method 100, and in particular the tracking phase 110, is carried out at a detection frequency Fa lower than the capture frequency $F_c$ at which the camera captures, or is configured to capture, or else is capable of capturing, images. Thus, according to at least one embodiment, the number of processed images is reduced, which reduces the computational resources and the communication resources to transfer and process the images by the tracking device.

The spatial distance threshold SDS may be defined in any suitable manner, for example by testing. According to one or more embodiments, the spatial distance threshold SDS may be defined based upon the dimensions of the target object. For example, according to one or more embodiments, the spatial distance threshold SDS can be proportional to the width of the target object on the image, such that:

$$SDS=K*L$$

where L is the width of the target object and K is a multiplier coefficient.

According to one or more embodiments, the multiplier coefficient K may be a function of the frequency, or the rate, of the iteration of the tracking phase 110. Indeed, the inventor has observed that a target object generally does not move by more than K times its own width. According to one or more embodiments, K is a real number such that $$K=k*D,$$

where:
D is the duration, in seconds, separating the capture times of two processed images during two successive iterations of the tracking phase, in particular D=DUR, or D=IM2−IM1; and k is a real number. According to one or more embodiments, $1 \leq k \leq 2$ Optionally, according to at least one embodiment, the method 100 may further comprise a step 140 of estimating the position of the target object at a time for which no image has been processed, and being located between the capture times of two processed images during two successive iterations of the tracking phase. This estimation can be carried out based upon the positions of the target object detected in said processed images.

According to one or more embodiments, the position of the target object can be estimated according to a linear movement law, at constant speed. For example, let P1 and P2 be the positions of the target object on two processed images IM1 and IM2 captured at times T1 and T2, respectively. The position of the target object at each time $TI_i$ located between times T1 and T2, such that $T1<TI_i<T2$ can be determined by estimating that the target object moved linearly, and at constant speed, between positions P1 and P2 during the duration (T2−T1).

Step 140 can be carried out during the implementation of the method 100 by way of at least one embodiment, for example between two iterations of the tracking phase 110. Alternatively, in one or more embodiments, step 140 can be carried out after implementing all the iterations of the tracking phase 110.

In the example described in reference to FIG. 1, the method 100 tracks a target object in real time, according to at least one embodiment. Of course, the method according to one or more embodiments of the invention can alternatively be used for tracking a target object which would not be in real time, but in an image stream captured before the execution of the method according to at least one embodiment of the invention.

Figure 2:
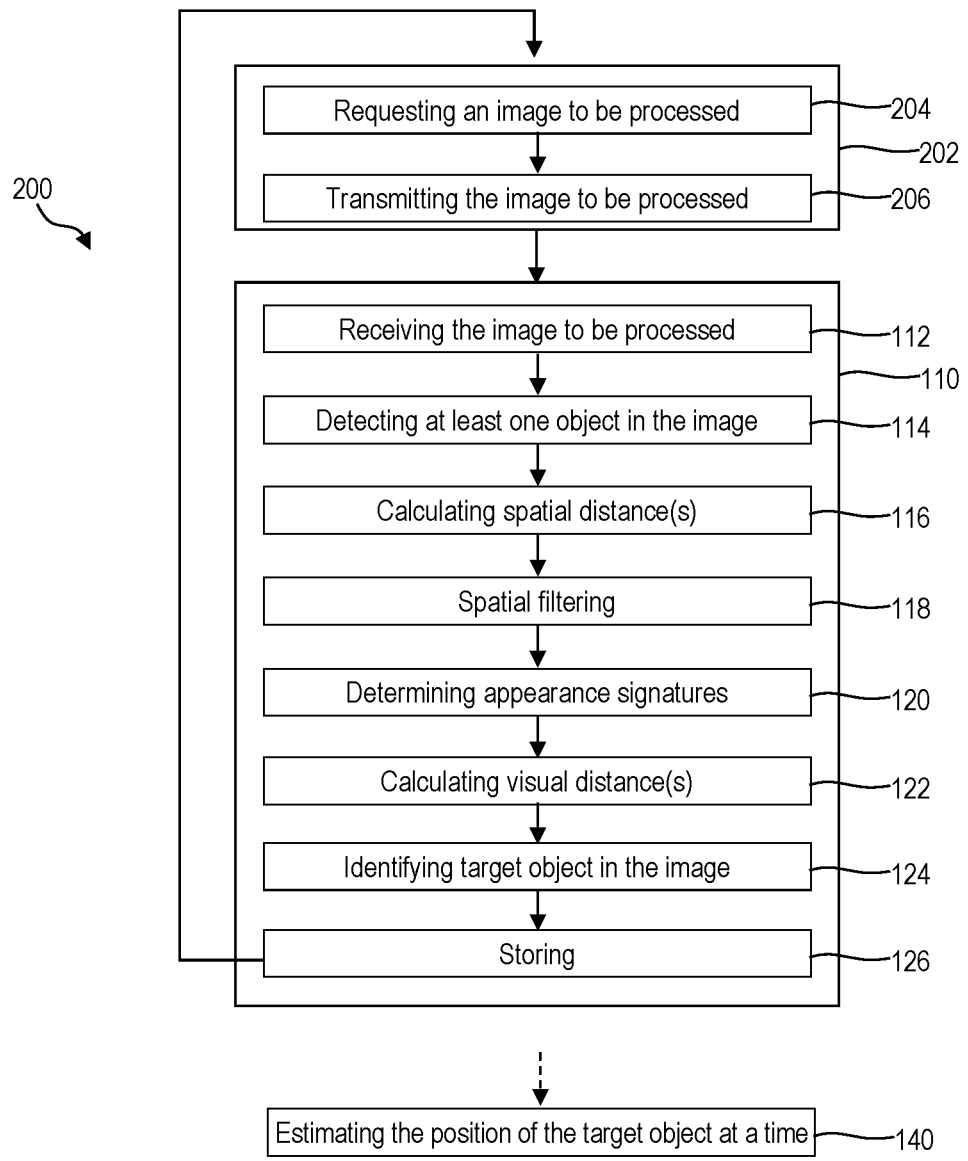
FIG. 2 is a schematic depiction of another method according to one or more embodiments of the invention for tracking a target object.

FIG. 2 is a schematic depiction of a method according to one or more embodiments of the invention for tracking a target object within a previously captured image stream.

The method 200 of FIG. 2 can be used for tracking any type of target objects such as humans, animals, cars, etc. Hereinafter, and without being any less general, it is assumed that the method is used for tracking a target person, within an image stream.

The image stream can be an image stream captured by one or more cameras, at a capture frequency $F_c$. For example, in at least one embodiment, the image stream may be an image stream captured by a single camera at a capture frequency $F_c$.

The method 200 comprises a step 202 of obtaining an image to be processed, denoted IM1, for a capture time T1, by way of one or more embodiments. This image IM1 is requested during a step 202 for example from a server on which the image stream is stored. During a step 206, the requested image IM1 is transmitted to the tracking device during a step 206.

The phase 202 of obtaining image IM1 is followed by the phase 110 of processing image IM1, according to at least one embodiment.

Then, in one or more embodiments, the method 200 is reiterated for a new image to be processed IM2 captured at a time T2. As indicated above with reference to FIG. 1, image IM2 is selected so that at least one non-processed image separates image IM1 and image IM2. According to at least one embodiment, image IM2 is selected so that IM2=IM1+N, so that the method 200 is reiterated every N images captured within the image stream. Alternatively, according to at least one embodiment, image IM2 is selected so that T2=T1+DUR, so that images IM2 and IM1 are separated in time by a duration DUR greater than the duration $1/F_c$ separating the capture times of two consecutive images in the image stream.

The method 200 may optionally comprise step 140, like the method 100 of FIG. 1, by way of at least one embodiment.

Figure 3:
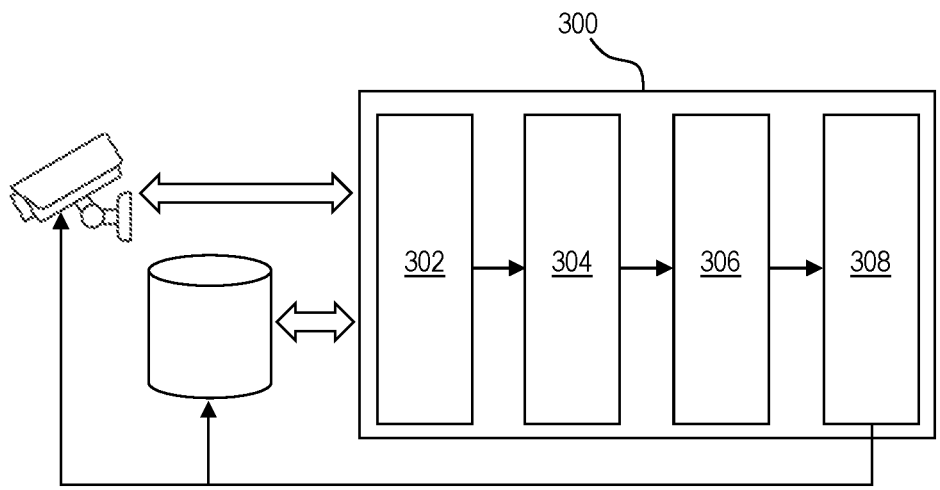
FIG. 3 is a schematic depiction of a device according to one or more embodiments of the invention.

FIG. 3 is a schematic depiction of a tracking device according to one or more embodiments of the invention.

The device 300 may be used to implement a tracking method according to one or more embodiments of the invention, and in particular the method 100 of FIG. 1 or the method 200 of FIG. 2.

The device 300 comprises a module 302 for receiving images to be processed coming from:
either a database, remote or local to said tracking device 300, in particular in the context of searching for and tracking a target object in a previously captured image stream;
or from one or more cameras, for example surveillance cameras, in particular in the context of real-time tracking of a target object.

The device 300 further comprises a module 304 for detecting at least one object, and its position, in a processed image received by the module 302. This detection module 304 can be configured to run an artificial intelligence model, and in particular a neural network, previously trained to detect the presence of an object in an image. Such a model may be a convolutional neural network, such as RESNET50, trained to detect objects in an image and indicate the position thereof.

The device 300 further comprises a module 306 for identifying the target object among the objects detected by the detection module 304 in the processed image. This identification module 304 can be configured to implement the following operations:
for each object detected on the processed image, calculating a spatial distance between the position of said object and the position of the target object detected on a previously processed image,
spatial filtering of the objects based upon said calculated distances and a spatial distance threshold value, SDS,
calculating an appearance distance between a visual signature of the target object detected on the previous image and a visual signature of each object detected on the processed image and retained after the filtering step, and
identifying the target object based on said appearance distances.

Module 306 is in particular configured to implement steps 116-124 of methods 100 or 200 of FIG. 1 or 2, according to at least one embodiment.

The device 300 further comprises a module 308 for requesting images to be processed from the database or from the at least one camera. This module 308 is configured so that two processed images of an image stream are separated from at least one non-processed image of said image stream:
either by imposing a time delay between the capture times of two consecutively processed images;
or by imposing a predetermined number of non-processed intermediate images between two consecutively processed images.

At least one of modules 302-308 may be a module independent of the other modules 302-308. At least two of modules 302-308 may be integrated within a single module, according to at least one embodiment.

Each module 302-308 may be:
- a hardware module, such as an electronic component like a processor, electronic chip, calculator, computer, server, etc.; or
- a software module, such as an application or a computer program, executed by an electronic component like a processor, electronic chip, computer, etc.

The device 300 may be at least a server, a computer, a processor, or an electronic chip.

The device 300 may be at least a computer program, or a virtual machine, executed by a server, a computer, a processor, or an electronic chip, etc.

Figure 4:
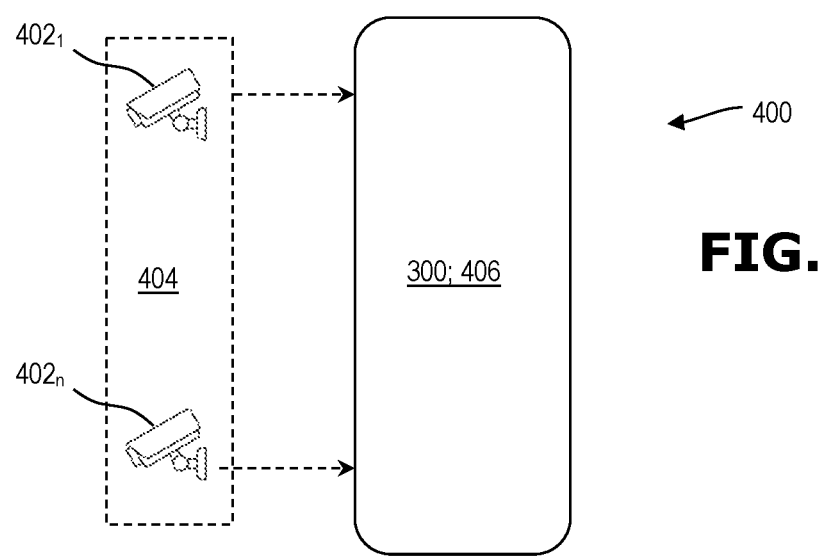
FIG. 4 is a schematic depiction of a system according to one or more embodiments of the invention.

FIG. 4 is a schematic depiction of a system according to one or more embodiments of the invention for tracking a target object in real time.

The system 400 may be used to implement a tracking method according to at least one embodiment of the invention, and in particular method 100 of FIG. 1.

The system 400 may be used for tracking a target object of any type, and in particular a target person, from at least one video stream coming from N cameras $402_1$-$402_n$ of said system 400, distributed in space and forming a network 404 of cameras, where n≥1. Alternatively, according to at least one embodiment, the system 400 can be used for tracking a target object of any type, and in particular a target person, from a video stream stored in a database (not shown in FIG. 4).

The system 400 further comprises a tracking device according to at least one embodiment of the invention 406, such as for example device 300 of FIG. 3.

The device 406 may be local to the cameras $402_1$-$402_n$ or remote from the cameras $402_1$-$402_n$.

The device 406 may be connected to each of the cameras $402_1$-$402_n$ by a wired or wireless connection.

Of course, the one or more embodiments of the invention are not limited to the examples disclosed above.

What is claimed is:

1. A method of tracking a target object in an image stream captured by a camera at a capture frequency ($F_c$), said method comprising:
   a tracking phase comprising a plurality of iterations of tracking said target object for each image of said image stream as a processed image, and said tracking phase comprising
      detecting at least one object, and a position of said at least one object, in the processed image, and
      identifying said target object among the at least one object that is detected in said processed image;
      wherein said tracking phase is carried out at a detection frequency ($F_s$), lower than said capture frequency ($F_c$), such that two images processed during two successive iterations of the tracking phase are separated by at least one non-processed image to which said tracking phase is not applied; and,
   wherein said identifying said target object in said processed image comprises
      for each object of said at least one object that is detected in said processed image, calculating a spatial distance between the position of said each object of said at least one object and the position of the target object detected on a previously processed image,
      spatial filtering of the each object of the at least one object based on said spatial distance that is calculated for said each object and a predetermined spatial distance threshold value (SDS),
      calculating an appearance distance between a visual signature of the target object detected on the previously processed image and a visual signature of said each object that is retained after the spatial filtering, and
      identifying the target object based on said appearance distance of said each object.

2. The method according claim 1, further comprising estimating a position of the target object at a time located between capture times of said two images processed during said two successive iterations of the tracking phase, based upon the position of said target object in each of said two images that are processed.

3. The method according to claim 1, wherein the tracking phase is implemented for said each image every N image(s), where N≥2 or N≥20, such that said two successive iterations of the tracking phase are applied to two images separated, over time, from said N images, which are not processed.

4. The method according to claim 1, wherein the tracking phase is carried out for each image captured every predetermined duration (DUR) of seconds.

5. The method according to claim 1, wherein the image stream is captured prior to a first iteration of the plurality of iterations of the tracking phase such that the target object is not tracked in real time.

6. The method according to claim 1, wherein the method is implemented to carry out real-time tracking of the target object, said method further comprising transmitting said each image that is processed from the camera to a tracking device.

7. The method according to claim 6, wherein said transmitting said each image that is processed from the camera to the tracking device is carried out at a request of said tracking device.

8. The method according to claim 6, wherein the camera is arranged to only capture processed images.

9. The method according to claim 1, wherein said detecting is carried out by an artificial intelligence model comprising a neural network, wherein said artificial intelligence model is previously trained to detect a presence of an object in an image.

10. A non-transitory computer program comprising executable instructions, which, when said executable instructions are executed by a computer apparatus, implement a method of tracking a target object in an image stream captured by a camera at a capture frequency ($F_c$), said method comprising:
   a tracking phase comprising a plurality of iterations of tracking said target object for each image of said image stream as a processed image, and said tracking phase comprising
      detecting at least one object, and a position of said at least one object, in the processed image, and
      identifying said target object among the at least one object that is detected in said processed image;
      wherein said tracking phase is carried out at a detection frequency ($F_s$), lower than said capture frequency ($F_c$), such that two images processed during two successive iterations of the tracking phase are separated by at least one non-processed image to which said tracking phase is not applied; and,
   wherein said identifying said target object in said processed image comprises for each object of said at least one object that is detected in said processed image, calculating a spatial distance between the position of said each object of said at least one object and the position of the target object detected on a previously processed image, spatial filtering of the each object of the at least one object based on said spatial distance that is calculated for said each object and a predetermined spatial distance threshold value (SDS), calculating an appearance distance between a visual signature of the target object detected on the previously processed image and a visual signature of said each object that is retained after the spatial filtering, and identifying the target object based on said appearance distance of said each object.

11. A system that tracks a target object, said system comprising:
at least one camera with an image stream capture frequency ($F_c$); and
a tracking device that tracks a target object, wherein said tracking device is configured to implement a method of tracking said target object in an image stream captured by said at least one camera at said image stream capture frequency ($F_c$), said method comprising
a tracking phase comprising a plurality of iterations of tracking said target object for each image of said image stream as a processed image, and said tracking phase comprising detecting at least one object, and a position of said at least one object, in the processed image, and identifying said target object among the at least one object that is detected in said processed image;

wherein said tracking phase is carried out at a detection frequency ($F_s$), lower than said image stream capture frequency ($F_c$), such that two images processed during two successive iterations of the tracking phase are separated by at least one non-processed image to which said tracking phase is not applied; and, wherein said identifying said target object in said processed image comprises for each object of said at least one object that is detected in said processed image, calculating a spatial distance between the position of said each object of said at least one object and the position of the target object detected on a previously processed image, spatial filtering of the each object of the at least one object based on said spatial distance that is calculated for said each object and a predetermined spatial distance threshold value (SDS), calculating an appearance distance between a visual signature of the target object detected on the previously processed image and a visual signature of said each object that is retained after the spatial filtering, and identifying the target object based on said appearance distance of said each object.

* * * * *